(12) United States Patent
Massari et al.

(10) Patent No.: US 7,649,052 B2
(45) Date of Patent: Jan. 19, 2010

(54) IMPACT RESISTANT POLYOLEFIN COMPOSITIONS

(75) Inventors: Paola Massari, Ferrara (IT); Jean News, Ferrara (IT); Marco Ciarafoni, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 437 days.

(21) Appl. No.: 11/596,503

(22) PCT Filed: May 4, 2005

(86) PCT No.: PCT/EP2005/004957

§ 371 (c)(1), (2), (4) Date: Nov. 13, 2006

(87) PCT Pub. No.: WO2005/113672

PCT Pub. Date: Dec. 1, 2005

(65) Prior Publication Data

US 2007/0203298 A1    Aug. 30, 2007

Related U.S. Application Data

(60) Provisional application No. 60/579,087, filed on Jun. 10, 2004.

(30) Foreign Application Priority Data

May 21, 2004  (EP) .................................. 04012148

(51) Int. Cl.
C08L 23/00  (2006.01)
C08L 23/16  (2006.01)
C08L 23/10  (2006.01)
C08F 297/08  (2006.01)

(52) U.S. Cl. .......................... 525/240; 525/53; 525/54; 525/191

(58) Field of Classification Search ................ 525/191, 525/240
See application file for complete search history.

(56) References Cited

U.S. PATENT DOCUMENTS

| 4,298,718 | A | 11/1981 | Mayr et al. |
| 4,399,054 | A | 8/1983 | Ferraris et al. |
| 4,469,648 | A | 9/1984 | Ferraris et al. |
| 4,472,524 | A | 9/1984 | Albizzati |
| 4,495,338 | A | 1/1985 | Mayr et al. |
| 5,145,819 | A | 9/1992 | Winter et al. |
| 5,324,800 | A | 6/1994 | Welborn, Jr. et al. |
| RE37,384 | E | 9/2001 | Winter et al. |

FOREIGN PATENT DOCUMENTS

| EP | 45977 | 2/1982 |
| EP | 129368 | 12/1984 |
| EP | 361493 | 4/1990 |
| EP | 416815 | 3/1991 |
| EP | 420436 | 4/1991 |
| EP | 643066 | 3/1995 |
| EP | 485823 | 5/1995 |
| EP | 671404 | 9/1995 |
| EP | 728769 | 8/1996 |
| JP | 58162621 | 9/1983 |
| WO | 91/04257 | 4/1991 |
| WO | 00/63261 | 10/2000 |
| WO | 01/57099 | 8/2001 |
| WO | 02/30998 | 4/2002 |
| WO | 03/051984 | 6/2003 |
| WO | 03/106514 | 12/2003 |
| WO | 2004/003072 | 1/2004 |
| WO | 2004/003073 | 1/2004 |
| WO | 2005/044911 | 5/2005 |

*Primary Examiner*—Irina S Zemel
*Assistant Examiner*—Jeffrey Lenihan
(74) *Attorney, Agent, or Firm*—Jarrod N. Raphael

(57) ABSTRACT

A heterophasic polyolefin composition comprising:
(A) 50-0% of a crystalline propylene polymer;
(B) 5-20% of a first elastomeric copolymer of ethylene with at least a $C_3$-$C_8$ α-olefin comonomer; and
(C) 10-45% of a second elastomeric copolymer of ethylene with at least a $C_3$-$C_8$ α-olefin comonomer;
wherein the ratio between the ethylene content of the fraction insoluble in xylene at room temperature ($C_2$xif) multiplied by the weight percentage of the fraction insoluble in xylene at room temperature (% XIF) and the ethylene content of the fraction soluble in xylene at room temperature ($C_2$xsf) multiplied by the weight percentage of fraction soluble in xylene at room temperature (% SXF) satisfies the following relation (I):

$$\frac{C_2 xif \times \%XIF}{C_2 xsf \times \%SXF} > 0.01x + 0.261,$$

wherein x is the total amount of ethylene.

11 Claims, No Drawings

IMPACT RESISTANT POLYOLEFIN COMPOSITIONS

The present invention relates to polyolefin compositions with a good balance of stiffness and impact resistance and high elongation and a process for the preparation of the said compositions.

As is known, isotactic polypropylene is endowed with good stiffness but it has poor impact resistance and elongation values. The impact resistance properties at low temperatures can be improved by adding rubber to isotactic polypropylene. The drawback that shows the thus obtained polymer compositions is a strong decrease of stiffness with respect to the isotactic polypropylene alone.

Japanese Patent Laid-Open Pub. No. 162621/1983 describes an olefin block copolymer made from 20 to 70 parts by weight of a highly crystalline propylene polymer, 5 to 30 parts by weight of a propylene-ethylene random copolymer containing from 8 to less than 30 wt % of ethylene and 10 to 75 parts by weight of a propylene-ethylene random copolymer having an ethylene content of 30 to 85 parts by weight. The copolymer composition possesses good impact resistance at low temperatures and very high flexibility.

Therefore there is a need for stiffer polyolefin compositions that, however, maintain high stiffness and good impact resistant properties both at ambient and at low temperatures and high elongation values as well.

The Applicant has now discovered heterophasic polyolefin compositions endowed with a particularly advantageous balance of properties, in particular of higher stiffness without decreasing the impact resistance, especially impact strength at low temperatures, and resilience properties.

The compositions of the present invention also have high tensile strength and elongation at break.

In the compositions of the present invention the crystalline polymer fraction typically possess a broad distribution of molecular weights.

The compositions with the said properties are obtained by operating in at least three polymerisation stages. In the first stage propylene is polymerised or copolymerised with minor amounts of comonomer(s), and in the second and third stage ethylene/α-olefin(s) mixtures are copolymerised in the presence of the propylene polymer obtained in the preceding step(s).

Thus, the present invention concerns a heterophasic polyolefin composition and comprising (percent by weight):

(A) from 50 to 80% of a crystalline propylene polymer having a polydispersity index value from 5.2 to 10 and a content of isotactic pentads (mmmm), measured by $^{13}$C-NMR on the fraction insoluble in xylene at 25° C., higher than 97.5 molar %; said polymer being selected from a propylene homopolymer and a copolymer of propylene and at least a comonomer selected from ethylene and an alpha-olefin of formula $H_2C\!=\!CHR$, where R is a $C_{2-6}$ linear or branched alkyl radical, containing at least 95% of recurring units deriving from propylene;

(B) from 5 to 20% of a first elastomeric copolymer of ethylene with at least a comonomer selected from propylene and another α-olefin of formula $H_2C\!=\!CHR$, where R is a $C_{2-6}$ linear or branched alkyl radical; said first elastomeric copolymer containing from 25 to less than 40%, preferably from 25 to 38%, of ethylene, and being soluble in xylene at room temperature in an amount from higher than 85 to 95 wt %, the intrinsic viscosity [η] of the xylene soluble fraction ranging from 2.5 to 4.5 dL/g; and (C) from 10 to 40% of a second elastomeric copolymer of ethylene with at least a comonomer selected from propylene and another α-olefin of formula $H_2C\!=\!CHR$, where R is a $C_{2-6}$ linear or branched alkyl radical; said second elastomeric copolymer containing from 50 up to 75%, preferably from 55 to 70%, of ethylene, and being soluble in xylene at room temperature in an amount from 50 to 85 wt %, preferably 55-85%, the intrinsic viscosity [η] of the xylene soluble fraction ranging from 1.8 to 4.0 dL/g.

In said heterophasic polyolefin composition the sum of amounts of copolymer (B) and copolymer (C) ranges from 20 to 45%, preferably from 22 to 45%, based on the total amount of components (A) to (C), the total amount of ethylene based on the total amount of components (A) to (C) is up to 23% by weight and the ratio between the ethylene content of the fraction insoluble in xylene at room temperature ($C_2xif$) multiplied by the weight percentage of the fraction insoluble in xylene at room temperature (% XIF) and the ethylene content of the fraction soluble in xylene at room temperature ($C_2xsf$) multiplied by the weight percentage of fraction soluble in xylene at room temperature (% SXF), i.e. ($C_2xif\cdot$% XIF)/($C_2xsf\cdot$% SXF), satisfies the following relation (I):

$$\frac{C_2xif \times \% \ XIF}{C_2xsf \times \% \ SXF} > 0.01x + 0.261,$$

wherein x is the total amount of ethylene.

Typically the composition of the present invention shows a molecular weight distribution in component (A), expressed by the ratio between the weight average molecular weight and numeric average molecular weight, i.e. $\overline{M}_w/\overline{M}_n$, measured by GPC, equal to or higher than 9, in particular from 9.5 to 20.

Typically the composition of the present invention shows a value of z average molecular weight to weight average molecular weight ratio, i.e. $\overline{M}_z/\overline{M}_w$, in component (A), measured by GPC, of at least 4.5, preferably 5, for example from 5 to 10.

Typically the composition of the present invention shows Melt Flow Rate (MFR) value of 2 to 30 g/10 min.

Preferably, the said copolymers can contain recurring units deriving from ethylene and/or one or more $C_4$-$C_8$ α-olefin(s), such as for example butene-1, pentene-1,4-methylpentene-1, hexene-1 and octene-1, or combinations thereof. The preferred comonomer is ethylene.

The intrinsic viscosity [η] of elastomeric copolymer (B) can be equal to or different from the intrinsic viscosity [η] of elastomeric copolymer (C).

Crystalline polymer (A) typically has an MFR value ranging from 10 to 200 g/10 min.

The elastomeric copolymers (B) and (C) can optionally contain recurring units deriving from a diene, conjugated or not, such as butadiene, 1,4-hexadiene, 1,5-hexadiene and ethylidene-norbornene-1. The diene, when present, is typically in an amount of from 0.5 to 10% by weight with respect to the weight of the copolymer.

Typically, the composition of the present invention possesses a flexural modulus value of at least 600 MPa, such as from 600 up to 1400 MPa, preferably from 700 to 1300 MPa and an impact resistance value measured at 23° C. typically higher than 11 kJ/m$^2$, preferably higher than 19 kJ/m$^2$. The impact resistance value measured at –20° C. is typically at least 6 kJ/m$^2$, preferably at least 7 kJ/m$^2$. The elongation at break is typically at least 100%, preferable at least 150%. The energy value is typically higher than 10 J, preferably higher than 12. The ductile/brittleness transition temperature is typically lower than –50° C.

Therefore, the present invention is further directed to a process for the preparation of the polyolefin compositions as reported above, said process comprising at least three sequential polymerisation stages with each subsequent polymerisation being conducted in the presence of the polymeric material formed in the immediately preceding polymerisation reaction, wherein the crystalline polymer fraction (A) is prepared in at least one first stage, and the elastomeric fractions (B) and (C) are prepared in subsequently stages. The polymerisation stages may be carried out in the presence of a Ziegler-Natta catalyst.

According to a preferred embodiment, all the polymerisation stages are carried out in the presence of a catalyst comprising a trialkylaluminium compound, optionally an electron donor, and a solid catalyst component comprising a halide or halogen-alcoholate of Ti and an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Preferably the polymerisation catalyst is a Ziegler-Natta catalyst comprising a solid catalyst component comprising:
a) Mg, Ti and halogen and an electron donor selected from succinates, preferably from succinates of formula (I) below:

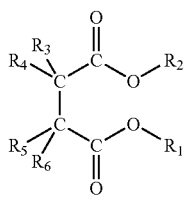

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from primary branched, secondary or tertiary alkyl groups, cycloalkyl, aryl, arylalkyl or alkylaryl groups having from 3 to 20 carbon atoms;
or of formula (II) below:

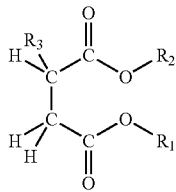

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms and the radical $R_3$ is a linear alkyl group having at least four carbon atoms optionally containing heteroatoms;
b) an alkylaluminum compound and, optionally (but preferably),
c) one or more electron-donor compounds (external donor).

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

The external donor (c) can be of the same type or it can be different from the succinates of formula (I) or (II). Suitable external electron-donor compounds include silicon compounds, ethers, esters such as phthalates, benzoates, succinates also having a different structure from those of formula (I) or (II), amines, heterocyclic compounds and particularly 2,2,6,6-tetramethylpiperidine, ketones and the 1,3-diethers of the general formula (III):

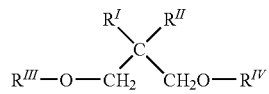

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

The electron-donor compounds that can be used as external donors also include aromatic acid esters such as alkyl benzoates, and in particular silicon compounds containing at least one Si—OR bond, where R is a hydrocarbon radical. A particularly preferred class of external donor compounds is that of silicon compounds of formula $R_a^7 R_b^8 Si(OR^9)_c$, where a and b are integer from 0 to 2, c is an integer from 1 to 3 and the sum (a+b+c) is 4; $R^7$, $R^8$, and $R^9$, are C1-C18 hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl. Examples of such preferred silicon compounds are cyclohexyltrimethoxysilane, t-butyltrimethoxysilane, t-hexyltrimethoxysilane, cyclohexylmethyldimethoxysilane, 3,3,3-trifluoropropyl-2-ethylpiperidyldimethoxysilane, diphenyldimethoxysilane, methyl-t-butyldimethoxysilane, dicyclopentyldimethoxysilane, 2-ethylpiperidinyl-2-t-butyldimethoxysilane, (1,1,1-trifluoro-2-propyl)-methyldimethoxysilane and (1,1,1-trifluoro-2-propyl)-2-ethylpiperidinyldimethoxysilane. Moreover, are also preferred the silicon compounds in which a is 0, c is 3, $R^8$ is a branched alkyl or cycloalkyl group, optionally containing heteroatoms, and $R^9$ is methyl. Particularly preferred specific examples of silicon compounds are (tert-butyl)$_2$Si(OCH$_3$)$_2$, (cyclohexyl)(methyl) Si(OCH$_3$)$_2$, (phenyl)$_2$Si(OCH$_3$)$_2$ and (cyclopentyl)$_2$Si(OCH$_3$)$_2$.

Preferably the electron donor compound (c) is used in such an amount to give a molar ratio between the organoaluminum compound and said electron donor compound (c) of from 0.1 to 500, more preferably from 1 to 300 and in particular from 3 to 100.

As explained above, the solid catalyst component comprises, in addition to the above electron donors, Ti, Mg and halogen. In particular, the catalyst component comprises a titanium compound, having at least a Ti-halogen bond and the above mentioned electron donor compounds supported on a Mg halide. The magnesium halide is preferably $MgCl_2$ in active form, which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerisation of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are $TiCl_4$ and $TiCl_3$; furthermore, also Ti-haloalcoholates of formula $Ti(OR)n-yXy$ can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula $Ti(OR)n-yXy$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compound(s) can be added during the treatment with $TiCl_4$.

Regardless of the preparation method used, the final amount of the electron donor compound(s) is preferably such that the molar ratio with respect to the $MgCl_2$ is from 0.01 to 1, more preferably from 0.05 to 0.5.

The said catalyst components and catalysts are described in WO 00/63261, WO 01/57099 and WO 02/30998.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257.

The catalysts may be precontacted with small quantities of olefin (prepolymerisation), maintaining the catalyst in suspension in a hydrocarbon solvent, and polymerising at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 microns, a flowability of less than 30 seconds and a bulk density (compacted) greater than 0.4 g/mL.

The polymerisation stages may occur in liquid phase, in gas phase or liquid-gas phase. Preferably, the polymerisation of the crystalline polymer fraction (A) is carried out in liquid monomer (e.g. using liquid propylene as diluent), while the copolymerisation stages of the elastomeric copolymers (B) and (C) are carried out in gas phase, without intermediate stages except for the partial degassing of the propylene. According to a most preferred embodiment, all the three sequential polymerisation stages are carried out in gas phase.

The reaction temperature in the polymerisation stage for the preparation of the crystalline polymer fraction (A) and in the preparation of the elastomeric copolymers (B) and (C) can be the same or different, and is preferably from 40 to 100° C.; more preferably, the reaction temperature ranges from 50 to 80° C. in the preparation of the fraction (A), and from 50 to 90° C. for the preparation of components (B) and (C).

The pressure of the polymerisation stage to prepare the fraction (A), if carried out in liquid monomer, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator.

The polymerisation pressure preferably ranges from 33 to 43 bar, if done in liquid phase, and from 5 to 30 bar if done in gas phase. The residence times relative to the two stages depend on the desired ratio between the fractions (A) and (B) and (C), and can usually range from 15 minutes to 8 hours. Conventional molecular weight regulators known in the art, such as chain transfer agents (e.g. hydrogen or $ZnEt_2$), may be used.

Conventional additives, fillers and pigments, commonly used in olefin polymers, may be added, such as nucleating agents, extension oils, mineral fillers, and other organic and inorganic pigments. In particular, the addition of inorganic fillers, such as talc, calcium carbonate and mineral fibers, also brings about an improvement to some mechanical properties, such as flexural modulus and HDT. Talc can also have a nucleating effect.

The nucleating agents are preferably added to the compositions of the present invention in quantities ranging from 0.05 to 2% by weight, more preferably from 0.1 to 1% by weight with respect to the total weight.

The particulars are given in the following examples, which are given to illustrate, without limiting, the present invention.

The following analytical methods have been used to determine the properties reported in the detailed description and in the examples.

Ethylene: By IR spectroscopy.

Fractions soluble and insoluble in xylene at 25° C.: 2.5 g of polymer are dissolved in 250 mL of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature (25° C.).

Intrinsic Viscosity [η]: Measured in tetrahydronaphthalene at 135° C.

Molecular weight ($\overline{M}_n$, $\overline{M}_w$, $\overline{M}_z$): Measured by way of gel permeation chromatography (GPC) in 1,2,4-trichlorobenzene.

Determination of isotactic pentads content: 50 mg of each xylene insoluble fraction were dissolved in 0.5 mL of $C_2D_2Cl_4$.

The $^{13}C$ NMR spectra were acquired on a Bruker DPX-400 (100.61 Mhz, 90° pulse, 12s delay between pulses). About 3000 transients were stored for each spectrum; mmmm pentad peak (21.8 ppm) was used as reference.

The microstructure analysis was carried out as described in literature (Polymer, 1984, 25, 1640, by Inoue Y. et Al. and Polymer, 1994, 35, 339, by Chujo R. et Al.).

Polydispersity index: Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

P.I.=$10^5$/Gc in which Gc is the crossover modulus which is defined as the value (expressed in Pa) at which G'=G" wherein G' is the storage modulus and G" is the loss modulus.

This method is used for polymers having an MFR value of 20 g/10 min or less.

Polydisperisty index: Measurement of molecular weight distribution of the polymer. To determine the PI value, the modulus separation at loss modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

PI=54.6×(modulus separation)$^{-1.76}$ wherein the modulus separation (MS) is defined as:

MS=(frequency at G'=500 Pa)/(frequency at G"=500 Pa)

wherein G' is the storage modulus and G" is the loss modulus.

This method is used for polymers having an MFR value over 20 g/10 min.

Melt flow rate: Determined according to ISO method 1133 (230° C. and 2.16 kg).

Flexural modulus: Determined according to ISO method 178.

Izod impact resistance: Determined according to ISO method 180/1A.

Break Energy: Determined according to the internal MA 17324 method. The same test specimens and testing method as for the determination of the ductile/brittle transition temperature (hereinafter described) are used but in the present case the energy required to break the sample at −20° C. is determined.

Ductile/Brittleness transition temperature: Determined according to internal method MA 17324, available upon request.

According to this method, the bi-axial impact resistance is determined through impact with an automatic, computerised striking hammer.

The circular test specimens are obtained by cutting with circular hand punch (38 mm diameter). They are conditioned for at least 12 hours at 23° C. and 50 RH and then placed in a thermostatic bath at testing temperature for 1 hour.

The force-time curve is detected during impact of a striking hammer (5.3 kg, hemispheric punch with a 1.27 mm diameter) on a circular specimen resting on a ring support. The machine used is a CEAST 6758/000 type model no. 2.

D/B transition temperature means the temperature at which 50% of the samples undergoes fragile break when submitted to the said impact test.

The Plaques for D/B measurement, having dimensions of 127×127×1.5 mm are prepared according to the following method.

The injection press is a Negri Bossi type (NB 90) with a clamping force of 90 tons. The mould is a rectangular plaque (127×127×1.5 mm).

The main process parameters are reported below:

| | |
|---|---|
| Back pressure (bar): | 20 |
| Injection time (s): | 3 |
| Maximum Injection pressure (MPa): | 14 |
| Hydraulic injection pressure (MPa): | 6 – 3 |
| First holding hydraulic pressure (MPa): | 4 ± 2 |
| First holding time (s): | 3 |
| Second holding hydraulic pressure (MPa): | 3 ± 2 |
| Second holding time (s): | 7 |
| Cooling time (s): | 20 |
| Mould temperature (° C.): | 60 |
| The melt temperature is between 220 and 280° C. | |

Tension stress at yield and at break: Determined according to ISO method 527;

Elongation at yield and at break: Determined according to ISO method 527;

Vicat softening temperature: Determined according to ASTM Standard D method 1525.

EXAMPLE 1

Preparation of the Solid Catalyst Component

Into a 500 mL four-necked round flask, purged with nitrogen, 250 mL of $TiCl_4$ are introduced at 0° C. While stirring, 10.0 g of microspheroidal $MgCl_2$ 1.9$C_2H_5OH$ (prepared according to the method described in ex. 2 of U.S. Pat. No. 4,399,054 but operating at 3000 rpm instead of 10000 rpm) and 9.1 mmol of diethyl 2,3-(diisopropyl)succinate are added. The temperature is raised to 100° C. and maintained for 120 min. Then, the stirring is discontinued, the solid product was allowed to settle and the supernatant liquid is siphoned off. Then 250 mL of fresh $TiCl_4$ are added. The mixture is reacted at 120° C. for 60 min and, then, the supernatant liquid is siphoned off. The solid is washed six times with anhydrous hexane (6×100 mL) at 60° C.

Catalyst System and Prepolymerisation Treatment

Before introducing it into the polymerisation reactors, the solid catalyst component described above is contacted at 12°

C. for 24 minutes with aluminium triethyl (AlEt$_3$) and dicyclopentyldimethoxysilane (DCPMS) in such quantity that the weight ratio of AlEt$_3$ to the solid catalyst component be equal to 11, and the weight ratio AlEt$_3$/DCPMS be equal to 4.4.

The catalyst system is then subjected to prepolymerisation by maintaining it in suspension in liquid propylene at 20° C. for about 5 minutes before introducing it into the first polymerisation reactor.

Polymerisation

The polymerisation run is conducted in continuous in a series of four reactors equipped with devices to transfer the product from one reactor to the one immediately next to it. The first two reactors are liquid phase reactors, and the third and fourth reactors are fluid bed gas phase reactors. Component (A) is prepared in the first and second reactor, while components (B) and (C) are prepared in the third and forth reactor, respectively.

Temperature and pressure are maintained constant throughout the course of the reaction. Hydrogen is used as molecular weight regulator.

The gas phase (propylene, ethylene and hydrogen) is continuously analysed via gas-chromatography.

At the end of the run the powder is discharged and dried under a nitrogen flow.

Then the polymer particles are introduced in an extrusion, wherein they are mixed with 8500 ppm of talc, 1500 ppm of Irganox B 215 (made of 1 part of Irganox 1010 and 2 parts of Irgafos 168) and 500 ppm of Ca stearate, to obtain a nucleated composition. The previously said Irganox 1010 is pentaerytrityl tetrakis 3-(3,5-di-tert-butyl-4-hydroxyphenyl) propanoate, while Irgafos 168 is tris (2,4-di-tert-butylphenyl) phosphite, both marketed by Ciba-Geigy. The polymer particles are extruded under nitrogen atmosphere in a twin screw extruder, at a rotation speed of 250 rpm and a melt temperature of 200-250° C.

EXAMPLE 2

Example 1 is repeated except that the polymerisation run is conducted in a series of three reactors, the first one only is a liquid phase reactor.

The main polymerisation conditions and the analytical data relating to the polymers produced in the reactors are reported in Table 1.

Tables 2 and 3 report the single components of the polyolefin composition, their amounts and properties and the properties of the whole polyolefin composition, respectively.

COMPARATIVE EXAMPLE 1

Example 1 is repeated except that in the second gas phase reactor the same type of elastomeric polyolefin as that produced in the first gas phase reactor is produced.

COMPARATIVE EXAMPLES 2 AND 3 (2c AND 3c)

Example 1 is repeated except that in the second gas phase reactor the same type of elastomeric polyolefin as that produced in the first gas phase reactor is produced and the catalyst component is replaced with a catalyst component equal to that described above except that it contains diisobutylphthahlate in the place of diethyl 2,3-(diisopropyl)succinate.

TABLE 1

Polymerisation Process

| | | Examples and comp. examples | | | | |
|---|---|---|---|---|---|---|
| | | 1 | 1c | 2c | 2 | 3c |
| 1$^{st}$ liquid phase reactor | Polymerisation temperature, ° C. | 67 | 67 | 70 | 68 | 70 |
| | Pressure, bar | 41 | 41 | 39.5 | 39.5 | 40 |
| | Residence time, min | 42 | 32 | 62 | 63 | 67 |
| | H$_2$ bulk, mol ppm | 9,000 | 10,000 | 15,000 | 11,000 | 13,000 |
| 2$^{nd}$ liquid phase reactor | Polymerisation temperature, ° C. | 67 | 67 | — | — | — |
| | Pressure, bar | 41 | 41 | — | — | — |
| | Residence time, min | 28 | 26 | — | — | — |
| | H$_2$ bulk, mol ppm | 9,900 | 10,000 | — | — | — |
| 1$^{st}$ gas phase reactor | Polymerisation temperature, ° C. | 80 | 80 | 80 | 80 | 80 |
| | Pressure, bar | 16 | 16 | 15 | 17 | 15 |
| | Residence time, min | 17 | 13 | 15 | 22.5 | 10 |
| | C$_2^-$/(C$_2^-$ + C$_3^-$), % | 0.13 | 0.23 | 0.36 | 0.12 | 0.42 |
| | H$_2$/C$_2^-$, % | 0.046 | 0.055 | 0.053 | 0.019 | 0.060 |
| 2$^{nd}$ gas phase reactor | Polymerisation temperature, ° C. | 84 | 80 | 80 | 80 | 80 |
| | Pressure, bar | 20 | 20 | 20.8 | 20 | 17 |
| | Residence time, min | 20 | 23 | 27 | 24.5 | 13 |
| | C$_2^-$/(C$_2^-$ + C$_3^-$), % | 0.41 | 0.23 | 0.36 | 0.47 | 0.42 |
| | H$_2$/C$_2^-$, % | 0.052 | 0.053 | 0.050 | 0.052 | 0.060 |

Notes:

H$_2$ bulk = hydrogen concentration in the liquid monomer; C$_2^-$ = ethylene; C$_3^-$ = propylene.

TABLE 2

Composition analyses

| | Examples and comparative example | | | | |
|---|---|---|---|---|---|
| | 1 | 1c | 2c | 2 | 3c |
| *Propylene homopolymer* | | | | | |
| Homopolymer content, wt % | 71 | 70 | 68 | 58.5 | 64 |
| MFR, g/10 min | 80 | 80 | 69 | 150 | 69 |
| Polydispersity index | 5.7 | 5.7 | 5 | 7 | 5 |
| $\overline{M}_w/\overline{M}_n$ ratio | 10.9 | 10.9 | 8.9 | 10.9 | 8.9 |
| $\overline{M}_z/\overline{M}_w$ ratio | 7.7 | 7.7 | 4.4 | 8.5 | 4.4 |
| Pentad content, % | 98 | 98 | 98.6 | 97.7 | 98.6 |
| Xylene-soluble (XS) fraction content, wt % | 2.5 | 2.5 | 2.0 | 3.5 | 2.0 |
| *First ethylene-propylene elastomeric copolymer* | | | | | |
| Copolymer content, wt % | 12 | 30 | 32 | 13.5 | 36 |
| Ethylene content, wt % | 37 | 42 | 47 | 28 | 52 |
| XS Intrinsic viscosity [η], dl/g | 2.86 | 2.96 | 2.98 | 3.8 | 2.95 |
| *Second ethylene-propylene elastomeric copolymer* | | | | | |
| Copolymer content, wt % | 17 | — | — | 28 | — |
| Ethylene content, wt % | 56 | — | — | 61 | — |
| XS Intrinsic viscosity [η], dL/g ($2^{nd}$ rubber) | 3.95 | — | — | 3.16 | — |
| *Final Composition* | | | | | |
| Total ethylene content, wt % | 14 | 12.5 | 15.1 | 20.7 | 18.9 |
| Total content of the elastomeric polymer fraction, wt % | 29 | 30 | 32 | 41.5 | 36 |
| Xylene-soluble fraction (XSF) content, wt % | 25.9 | 28.1 | 28.7 | 34.7 | 31.1 |
| Ethylene content in XSF, wt % | 44.1 | 37.3 | 41.6 | 44.1 | 44.9 |
| Xylene-insoluble fraction (XIF) content, wt % | 74.1 | 71.9 | 71.3 | 65.3 | 68.9 |
| Ethylene content in XIF, wt % | 6.7 | 4 | 6.4 | 11.5 | 9 |
| Intrinsic viscosity [η] of the xylene-soluble fraction, dL/g | 3.5 | 2.96 | 2.98 | 3.43 | 2.95 |
| ($C_2$xif · % IXF)/($C_2$xsf · % SXF) | 0.435 | 0.274 | 0.382 | 0.491 | 0.444 |
| 0.01x + 0.261 | 0.401 | 0.386 | 0.412 | 0.468 | 0.450 |

TABLE 3

Properties of the Whole Composition

| | Examples and Comparative example | | | | |
|---|---|---|---|---|---|
| | 1 | 1c | 2c | 2 | 3c |
| MFR "L", g/10 min | 13.3 | 14.7 | 14.3 | 7.8 | 10 |
| Flexural modulus, MPa | 1175 | 1150 | 988 | 823 | 887 |
| Izod impact resistance, kJ/m² at 23° C. | NB[1) | 13 | 17.2 | 56 | 49 |
| at 0° C. | 10.6 | 9.3 | 11.5 | 56 | 12.5 |
| at −20° C. | 7.6 | 7.5 | 9.2 | 16.2 | 8.9 |
| Tensile strength at yield, MPa | 20.3 | 19.4 | 18 | 15.9 | 16.2 |
| Elongation at Yield, % | 5.6 | 5.3 | 4.8 | 7.6 | 5 |
| Tensile strength at break, MPa | 16.2 | 15.1 | 13.8 | 15.7 | 12.8 |
| Elongation at break, % | 190 | 82 | 74 | 423 | 74 |
| Break energy at −20° C., J | 13.5 | 11 | 11 | — | — |
| D/B transition temperature, ° C. | <−50 | <−50 | <−50 | — | — |
| Vicat softening temperature at 5 kg, ° C. | 56.3 | 56.2 | 52.1 | — | — |

[1)N.B.: Not Broken

The invention claimed is:

1. A heterophasic polyolefin composition comprising (percent by weight):
   (A) from 50 to 80% by weight of a crystalline propylene polymer having a polydispersity index value from 5.2 to 10, and a content of isotactic pentads (mmmm), measured by $^{13}$C-NMR on a fraction insoluble in xylene at 25° C., higher than 97.5 molar %; said polymer being selected from a propylene homopolymer, and a copolymer of propylene and at least one comonomer selected from ethylene and an α-olefin of formula $H_2C=CHR$, where R is a $C_{2-6}$ linear or branched alkyl radical, comprising at least 95% of recurring units deriving from propylene;
   (B) from 5 to 20% by weight of a first elastomeric ethylene/propylene copolymer; said first elastomeric ethylene/propylene copolymer comprising from 25% to less than 40% by weight of ethylene, and is soluble in xylene at room temperature in an amount from higher than 85% to 95% by weight, wherein the xylene soluble fraction has an intrinsic viscosity [η] ranging from 2.5 to 4.5 dL/g; and
   (C) from 10 to 40% by weight of a second elastomeric ethylene/propylene copolymer; said second elastomeric ethylene/propylene copolymer comprising from 50% up to 75% by weight of ethylene, and is soluble in xylene at room temperature in an amount from 50% to 85% by weight, wherein the xylene soluble fraction has an intrinsic viscosity [η] ranging from 1.8 to 4.0 dL/g;
   wherein the sum of amounts of copolymer (B) and copolymer (C) ranges from 20 to 45% by weight based on the total amount of components (A) to (C), the total amount of ethylene based on the total amount of components (A) to (C) is up to 23% by weight, and the ratio between the ethylene content of the fraction insoluble in xylene at room temperature ($C_2$xif) multiplied by the weight percentage of the fraction insoluble in xylene at room temperature (% XIF) and the ethylene content of the fraction soluble in xylene at room temperature ($C_2$xsf) multiplied by the weight percentage of fraction soluble in xylene at room temperature (% SXF), demonstrated by the following formula, ($C_2$xif×% XIF)/($C_2$xsf×% SXF), satisfies relation (I):

$$\frac{C_2 xif \times \% \ XIF}{C_2 xsf \times \% \ SXF} > 0.01x + 0.261,$$

and wherein x is a total amount of ethylene.

2. The composition of claim 1, wherein component (A) has a value of z average molecular weight to weight average molecular weight ratio ($\overline{M}_z/\overline{M}_w$), measured by GPC, of at least 4.5.

3. A polymerisation process for preparing a heterophasic polyolefin composition comprising (percent by weight):
(A) from 50 to 80% by weight of a crystalline propylene polymer having a polydispersity index value from 5.2 to 10, and a content of isotactic pentads (mmmm), measured by $^{13}$C-NMR on a fraction insoluble in xylene at 25° C., higher than 97.5 molar %; said polymer being selected from a propylene homopolymer, and a copolymer of propylene and at least one comonomer selected from ethylene and an α-olefin of formula $H_2C=CHR$, where R is a $C_{2-6}$ linear or branched alkyl radical, comprising at least 95% of recurring units deriving from propylene;
(B) from 5 to 20% by weight of a first elastomeric ethylene/propylene copolymer; said first elastomeric copolymer comprising from 25% to less than 40% by weight of ethylene, and is soluble in xylene at room temperature in an amount from higher than 85% to 95 by weight, wherein the xylene soluble fraction has an intrinsic viscosity [η] ranging from 2.5 to 4.5 dL/g; and
(C) from 10 to 40% of a second elastomeric ethylene/propylene copolymer; said second elastomeric copolymer comprising from 50% up to 75% by weight of ethylene, and is soluble in xylene at room temperature in an amount from 50% to 85% by weight, wherein the xylene soluble fraction has an intrinsic viscosity [η] ranging from 1.8 to 4.0 dL/g;
wherein the sum of amounts of copolymer (B) and copolymer (C) ranges from 20 to 45% by weight based on the total amount of components (A) to (C), the total amount of ethylene based on the total amount of components (A) to (C) is up to 23% by weight, and the ratio between the ethylene content of the fraction insoluble in xylene at room temperature ($C_2$xif) multiplied by the weight percentage of the fraction insoluble in xylene at room temperature (% XIF) and the ethylene content of the fraction soluble in xylene at room temperature ($C_2$xsf) multiplied by the weight percentage of fraction soluble in xylene at room temperature (% SXF), demonstrated by the following formula, ($C_2$xif×% XIF)/($C_2$xsf×% SXF) satisfies relation (I):

$$\frac{C_2 xif \times \% \ XIF}{C_2 xsf \times \% \ SXF} > 0.01x + 0.261,$$

and wherein x is a total amount of ethylene; the process comprising at least three sequential steps, wherein components (A), (B) and (C) are prepared in separate subsequent steps, operating in each step, except the first step, in presence of the polymer formed and the catalyst used in the preceding step.

4. The polymerisation process of claim 3, wherein the catalyst is a Ziegler-Natta catalyst comprising a solid catalyst component comprising:
a) Mg, Ti, halogen, and an electron donor selected from succinates;
b) an alkylaluminum compound; and
c) optionally, at least one electron-donor compound.

5. The polymerisation process of claim 4, wherein the succinates are of formula (I):

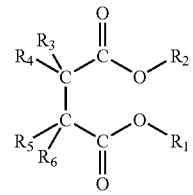

wherein
$R_1$ and $R_2$, equal to or different from each other, are a $C_1$-$C_{20}$ linear or branched alkyl, alkenyl, cycloalkyl, aryl, arylalkyl or alkylaryl group, optionally comprising at least one heteroatom;
$R_3$ to $R_6$, equal to or different from each other, are hydrogen or a $C_1$-$C_{20}$ linear or branched alkyl, alkenyl, cycloalkyl, aryl, arylalkyl or alkylaryl group, optionally comprising at least one heteroatom, and $R_3$ to $R_6$ can be linked together to form a cycle, with the proviso that when $R_3$ to $R_5$ are hydrogen, $R_6$ is a radical selected from a primary branched, secondary or tertiary alkyl group, cycloalkyl, aryl, arylalkyl or alkylaryl group comprising from 3 to 20 carbon atoms, or a linear alkyl group comprising at least four carbon atoms optionally comprising at least one heteroatom;

or of formula (II):

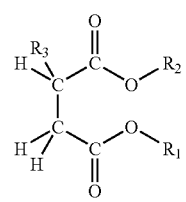

wherein
$R_1$ and $R_2$, equal to or different from each other, are a $C_1$-$C_{20}$ linear or branched alkyl, alkenyl, cycloalkyl, aryl, arylalkyl or alkylaryl group, optionally comprising at least one heteroatom; and
$R_3$ is a linear alkyl group comprising at least four carbon atoms optionally comprising at least one heteroatom.

6. The polymerisation process of claim 4, wherein the electron-donor compound is an external donor.

7. The composition of claim 1, wherein the composition has a flexural modulus value ranging from 600 MPa to 1400 MPa.

8. The composition of claim 1, wherein the composition has a flexural modulus value ranging from 700 MPa to 1300 MPa.

9. The composition of claim 1, wherein the composition has an impact resistance value higher than 19 kJ/m$^2$, measured at 23° C.

10. The composition of claim 1, wherein the composition has an impact resistance value of at least 7 kJ/m$^2$, measured at −20° C.

11. The composition of claim 1, wherein the composition has an elongation at break is of at least 150%.

* * * * *